P. A. MONTROY.
AUTOMATIC AUTOMOBILE TOP.
APPLICATION FILED JUNE 24, 1916.
1,280,272.
Patented Oct. 1, 1918.
2 SHEETS—SHEET 1.
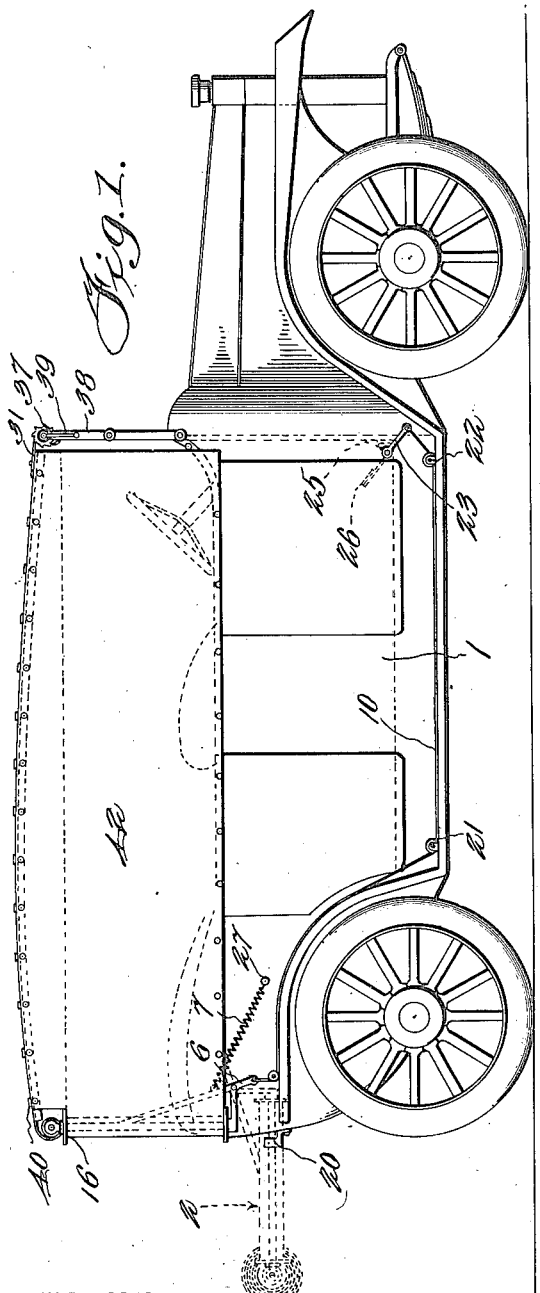
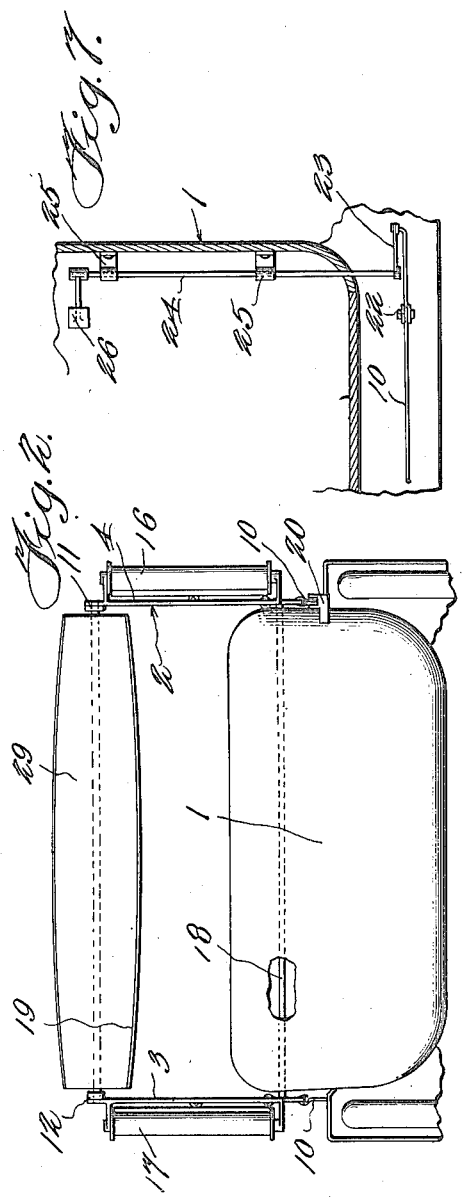
INVENTOR
Philip A. Montroy,
WITNESSES
BY
ATTORNEY

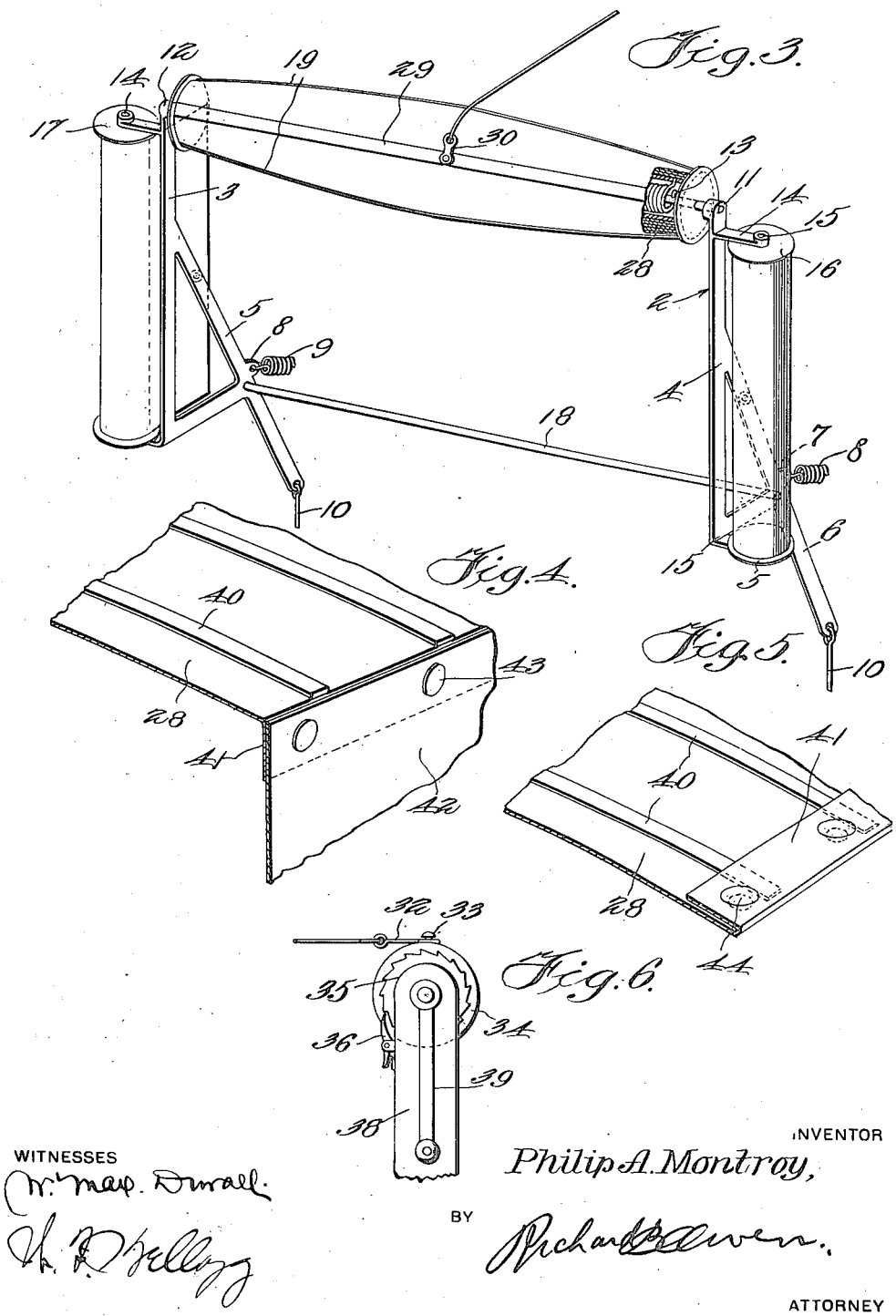

UNITED STATES PATENT OFFICE.

PHILIP A. MONTROY, OF SAN ANTONIO, TEXAS.

AUTOMATIC AUTOMOBILE-TOP.

1,280,272.  Specification of Letters Patent.  Patented Oct. 1, 1918.

Application filed June 24, 1916. Serial No. 105,652.

*To all whom it may concern:*

Be it known that I, PHILIP A. MONTROY, a citizen of the United States, residing at San Antonio, in the county of Bexar and State of Texas, have invented certain new and useful Improvements in Automatic Automobile-Tops, of which the following is a specification.

This invention relates to vehicle tops, and more particularly has for its object the provision of a vehicle top, which may be readily removed and positioned in an out of the way or inoperative manner.

The primary object of the invention resides in the provision of a device of the character described wherein means are provided for the rolling of a curtain upon a spring actuated drum, so that when in an inoperative position the same is so arranged as to constitute a neatly appearing and weather proof roll.

Another object of the invention, is to provide side curtains similarly mounted, whereby the vehicle may be readily closed upon all sides, consequently protecting occupants from the elements..

The invention also contemplates the provision of means whereby the top and side curtains may be readily moved into an operative position by the occupant of the vehicle, without the necessity of leaving the same, the said means comprising a rotary drum, which is provided with the usual pawl and ratchet mechanism to prevent its accidental unwinding any further, with a crank member whereby said drum may be readily rotated.

A further important characteristic of the present invention resides in the means whereby the top and side curtains are supported, the said means including a pivotally supported frame member, which member may be swung from an inoperative position into an operative position through the medium of a suitable connection, operated by means of a foot lever, conveniently positioned before the occupant of the car.

Other features of the invention reside in an improved manner whereby the top is rendered sufficiently rigid to allow the same to be readily adapted to be used for the purpose for which it is desired, that is, in providing the same with semi-rigid cross pieces or slats which are secured thereto by suitable fastening devices.

All of the foregoing together with additional advantageous details and arrangement of parts of the preferred embodiment of my invention will be clear from the specific description hereinafter contained, when read in connection with the accompanying drawings forming a part hereof, wherein said embodiments of the invention are illustrated for the purpose of facilitating full understanding of the present invention.

In the drawings:—

Figure 1 is a side elevation of a motor vehicle showing my improved device applied;

Fig. 2 is a rear elevation, portions thereof broken away and illustrating the manner in which the top and side curtains are supported;

Fig. 3 is a perspective of the frame for supporting the top and side curtains;

Fig. 4 is a fragmentary detail in perspective showing the construction and arrangement of the top and side curtains;

Fig. 5 is a fragmentary detail in perspective of the top, showing the flap used for securing the side curtains thereto in a folded position, and ready for rolling;

Fig. 6 is a detail in side elevation of the winding drum whereby the curtain is unrolled and moved into an operative position; and Fig. 7 is a fragmentary view in detail showing the construction and arrangement of the foot lever for raising the pivoted supporting frame into an operative position.

Referring now to the drawings wherein like reference numerals designate like or corresponding parts throughout the several views, 1 represents a vehicle to which my improved device has been applied. Pivotally supported within the rear end of the vehicle is a supporting frame 2, the same comprising vertically disposed standards 3 and 4, which are provided with complementally arranged angularly extended arms 5 and 6, the lower end of said arms being provided with loops 7 and 8, which are adapted to receive one end of helical springs 9, while the extreme lower end thereof is provided with apertures whereby the same may be connected with cables, or cords, 10, the purpose of which shall be subsequently described.

The upper extremities of the vertical standards 3 and 4 are provided with bracket portions 11 and 12, which portions are adapted to receive a spring operated winding drum 13, by means of suitable bearing pintles arranged thereon and concentrically thereof. The sides of the vertical standards 3 and 4 are also provided with arms 14 and 15 which arms have arranged therein suitable bearings, generally numbered 15, whereby spring actuated winding drums 16 and 17 may be vertically positioned. In order to allow for the pivotal movement of the frame 2, I provide a transverse bar 18, which is received within suitable bearings within the rear end of the vehicle. To provide for means whereby the top may be compactly or closely wound upon the drum 13, I provide a pair of substantially arcuate arms generally numbered 19, the ends of which are secured to the circular end of said drum in any convenient manner, thus, it will be seen, that the curtain will be guided upon the winding drum and will be securely held thereupon. When it is desired to move the supporting frame 2 into an inoperative or out of the way position, the same is swung upon its pivot into a position as shown in dotted lines in Fig. 1, the frame being supported in its inoperative or lowermost position, by means of a bracket arm 20, which is securely fixed to the rear end of the vehicle. In order to provide for means whereby the frame member 2 may be moved into an operative position, I secure the cords 10 to their respective apertures in the lower extremity of the arms 5 and 6, and extend these cords forwardly under guide rolls 21 and 22, whereupon the same are attached to crank arms 23, which are in turn secured to the ends of a transverse shaft 24, rotatably supported upon the dash board of the vehicle by brackets 25, the shaft 24, being provided intermediate its ends with a foot lever 26, thereby affording means whereby the operator of the vehicle may readily raise the frame 2. From the foregoing, it will be noted, that it is necessary to provide means whereby the pivotally supported frame member 2 may be held in its operative or raised position, and to this end, I employ the helical springs 9, which engage the portions 7 and 8 of the arms 5 and 6, while the remaining ends thereof are secured to the body of the vehicle, as at 27.

Referring now to the top and side curtains, 28 represents a flexible top which when in an inoperative position is rolled upon the winding drum 13, the forward end of the top being provided with a rigid end piece 29, which has secured thereto, intermediate its length, a connecting link 30, the link having arranged in its outer end and secured thereto a flexible cord or cable 31, the forward end of which, has secured thereto a hooked or looped member 32, said member being adapted to engage with a stud 33 arranged upon a manually operated winding drum 34, said winding drum being provided with a ratchet wheel 35 and a pivoted pawl for engagement therewith as at 36 for preventing accidental reverse movement of the winding drum. It may be noted that the winding drum is supported within suitable bearings 37, which bearings may be supported upon the usual supporting frame 38 of a windshield, or if so desired may be arranged upon a specially designed supporting arm such as conditions or preferences may dictate. The outer end of the winding drum 34 is provided with a crank 39 whereby the said winding drum may be readily rotated for the purpose as understood. With a view toward providing a top which will be efficient for the purpose designed, namely, to provide one which possesses sufficient rigidity to support the same and to readily shed the weather, I arrange upon the top 28 a series of practically rigid transversely arranged slats 40, thus, serving as efficient means for preventing the sagging of the top, while each side of the top is provided with a flap portion 41, which is provided with, at spaced intervals throughout its length, a plurality of sockets 44 (see Fig. 5). The side curtains of the device are shown at 42, and when in an inoperative position are rolled upon their respective spring actuated winding drums 16 and 17, and are provided with adjacent their top edges a plurality of complementally arranged snap members which are received within the socket members 44.

Coming now to the operation of the device, and assuming that the pivotally supported frame 2 with the top and side curtains is in an inoperative position, and the operator desires to move the same into an operative position so that the top and side curtains may be unrolled, a pressure is brought to bear upon the foot lever 26 causing the cords 10 to be moved, which motion will cause the frame member 2 to be swung upon its pivot bar 18, into an upright or operative position, in which position it will be readily held by means of the helical springs 9. The cord 31 which is attached to the rigid end piece 29 of the top is then through the medium of the loop 32, attached to the stud 33 of the winding drum 34 whereupon the winding drum is rotated by means of the crank 39, thereby causing the cords 31 to be wound thereupon and upon continued movement will cause the top 28 to be unrolled. When the top has been slightly unrolled and the operator desires to unroll the side curtains 42, a portion of these curtains are pulled forward sufficiently to allow their respective snap members to be engaged with the sockets arranged in the flap 41 of the top. Upon continued rotation of the drum 34, it will be seen that the top together with the side curtains will be moved forwardly into the desired position, whereupon the crank is released and due to the pawl and ratchet arrangement, the same, that is, the top and side curtains will be prevented from being wound upon their respective spring actuated winding drums. It will be noted that these spring wound drums offer sufficient tension to hold the top and side curtains taut, thereby providing for means to prevent the sagging of these various members. When it is desired to reroll the top and side curtains, it is only necessary that the side curtains be detached from the top and folded into a position whereby the same may be readily received upon their respective spring wound drum. The pawl 36 is then disengaged with the ratchet wheel 35 of the winding drum 34 and the winding drum 14 is permitted to slowly rotate, whereupon the top will be rolled upon its respective spring actuated winding drum 13. The movable frame 2 may then be grasped and moved downwardly against the tension of the helical springs 9 into a position where the same may be received by its supporting bracket arm 20, ready for subsequent operation.

From the foregoing, it will be appreciated that by simple, inexpensive means, I have provided a practical vehicle top which is highly efficient for the purpose designed and which may be manufactured at a minimum cost.

While I have herein disclosed one special embodiment of the invention, it will be apparent to persons skilled in the art, that changes may be made in the construction and arrangement of the parts without departing from the spirit of the invention, or the scope of the appended claims.

I claim:

1. A portable vehicle top, including a supporting frame pivotally secured to the vehicle, a plurality of vertically disposed spring winding drums carried by the supporting frame, a horizontally arranged spring winding drum carried by the frame, a flexible top engageable about said horizontal winding drum, flexible side curtains engageable about said vertically disposed spring winding drums, means arranged upon said top and said side curtains whereby the same may be connected, a manually operated winding drum arranged forwardly of said supporting frame and engageable with the free extremities of said flexible top whereby the same may be drawn forwardly over the vehicle, and means for securing the top and side curtains in their distended position.

2. A portable vehicle top including a supporting frame pivotally secured to the vehicle, a plurality of vertically disposed spring winding drums carried by the supporting frame, a horizontally arranged spring winding drum carried by the frame, a flexible top engageable about said horizontal winding drum, flexible side curtains engageable about said vertically disposed spring winding drums, means arranged on said top and said side curtains whereby the same may be connected and means engageable with the free extremity of said flexible top, whereby the same may be drawn forwardly over the vehicle, and means for securing the top and side curtains in their extended position.

3. A portable vehicle top including a supporting frame pivotally secured to the vehicle, a plurality of vertically disposed winding drums carried by the supporting frame, a horizontally arranged winding drum carried by said frame, a flexible top engageable about said horizontal winding drum, flexible side curtains engageable about said vertically disposed winding drums, means arranged upon said top and said side curtains, whereby the same may be connected, means engageable with the free extremity of said flexible top for drawing the same forwardly over the vehicle, and means for securing the top and side curtains in their extended position.

4. A portable vehicle top, including a supporting frame pivotally secured to the vehicle, said supporting frame comprising vertical standards, angular arms extending from said standards, brackets projecting from the upper ends of said standards parallel arms projecting outwardly from each standard, vertically disposed winding drums carried by said arms, a horizontally arranged winding drum carried by said brackets, means connected to said angular arms for swinging said frame to an operative position, a flexible top engageable about the horizontal winding drum, flexible side curtains engageable about said vertically disposed winding drums, means for drawing said top and side curtains forwardly over the vehicle, and means for securing said top and side curtains in their extended positions.

In testimony whereof I affix my signature in presence of two witnesses.

PHILIP A. MONTROY.

Witnesses:
JOSEPHINE COTTO,
M. A. MURPHY.